United States Patent Office 3,557,181
Patented Jan. 19, 1971

3,557,181
OILY POLYMER HAVING POLYETHER CHAIN
AND NITROALKYL GROUPS
Julian Lakritz, Rahway, and William E. Tyler III, New
Providence, N.J., assignors to Esso Research and Engineering Company, a corporation of Delaware
No Drawing. Filed Dec. 11, 1961, Ser. No. 159,819
Int. Cl. C07c *43/04, 119/04*
U.S. Cl. 260—453                                    4 Claims This invention relates to a high-energy oxidizer binder for potent solid rocket propellant fuels and oxidizers. It is concerned particularly with novel polymers of nitro group-containing epoxides that can be satisfactorily crosslinked to form a cast propellant.

Nitro polymers are of interest for use with certain high-energy fuels such as those containing boron or beryllium, and for use with oxidizers containing $NF_2$ groups. By having nitro groups in the binder, there is less need for the more unstable high-energy oxygen oxidizers. At the same time, the preparation of a nitro polymer suitable for compounding with other ingredients of the propellant and for making a cast propellant is desired.

In accordance with the present invention, methods have been found for polymerizing epoxides containing nitro groups to form polymers loaded with nitro groups and having reactive hydroxyl groups for crosslinking. These polymers are viscous oils and have principally a polyether chain. The reactive hydroxyl groups of the epoxide polymers readily undergo reactions with crosslinking compounds, which may also contain energetic groups, to set to solid polymer binders.

A number of nitro epoxides that can be used for the polymerization are available at present, and others are being developed. These nitro epoxides are typified by 3-nitropropene oxide, 4,4,4-trinitrobutene oxide, and 1,1,1,6,6,6-hexanitro-3-hexene oxide.

To form the prepolymer oils with hydroxyl end groups, a catalyst found to be most suitable is $PF_5$ and its ether complexes. Experiments carried out with this catalyst indicate that the polymerization of the nitro epoxides is initiated at very low temperatures, apparently as low as —20° C., and the polymerization can be completed at temperatures ranging up to room temperature, or 25° C. The $PF_5$ catalyst may be used as such or in the form of a complex such as $PF_5$/tetrahydrofuran complex, or $PF_5$/ether complex. The $PF_5$ or the $PF_5$ complex is also effective in a solvent such as tetrahydrofuran, methylene dichloride, and similar solvents. When solvents are employed, it is normally desirable to employ substances of sufficiently high volatility so that they can be readily removed from the prepolymer oil.

Analytical tests made on the prepolymers formed from nitro epoxides with the $PF_5$ catalyst showed that the polymers contained terminal hydroxyl groups and that carbonyl groups were not present to an appreciable extent. There were indications that $PF_5$ catalyst also could remain in the prepolymer without adverse effects in crosslinking. The amount of $PF_5$ catalyst employed may be relatively small, e.g. 0.5 to 6 wt. percent based on the nitro epoxide, although larger amounts may be used if desired.

For studying the polymerization of nitro epoxides, the monomer chosen was 3-nitropropene oxide which has the following formula:

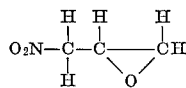

This monomer is polymerized to form the branched polymer, indicated to have the following recurring unit:

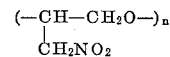

The polymer is believed to consist of a number $n$ recurring units where $n$ has a value of 5 to 10. The linear chain is composed of ether groups with pendent nitro methyl groups. Hydroxyl groups located at the ends of the molecule are considered the reactive sites for crosslinking.

A high purity (above 99%) 3-nitropropene oxide was prepared by reacting epiiodohydrin with silver nitrite in anhydrous ether at 25° C. for a number of hours. This moderate temperature reaction was used to avoid formation of undesired side reactions. At the completion of the reaction, solids were filtered from the liquid reaction mixture and the ether was removed from the filtrate in a stream of $N_2$. The liquid residue was distilled and a fraction having a boiling point of 50° to 52° C. under 2 mm. Hg abs. was collected. Analysis showed that this product has a composition in agreement with the formula given for 3-nitropropene oxide.

Care was taken in the initial preparation of the polymers from 3-nitropropene oxide to avoid explosions.

The following examples set forth procedures satisfactory for producing the prepolymers of the nitro epoxides and for producing the crosslinked castable binders from these prepolymers, such as are useful in formulating cast solid propellants.

EXAMPLE 1

To about 0.5 ml. of 3-nitropropene oxide was added about 1 wt. percent of $PF_5$/tetrahydrofuran complex. The resulting mixture was stirred for 4 days starting at temperatures as low as —70° C. and permitting the mixture to warm up to 25° C. over a period of 4 days. At the end of the polymerization reaction, the liquid had thickened and acquired a cherry-red color. This liquid product was fractionated by first washing with ethyl ether to remove any unreacted nitro epoxide, then washed with methanol to remove a less viscous liquid portion of the product. The more viscous oil remaining was reprecipitated once by dissolving in acetone and adding chloroform. The viscous oily prepolymer was placed under vacuum for a period of 2 days to strip out any remaining low-boiling solvent or volatile material, and then submitted for analysis. Analytical results showed that the polymer contained substantially the amount of nitrogen required in accordance with theory, i.e. 13.6%. The analytical results indicated that there was no appreciable degradation of the polymer with respect to the monomer. The molecular weight of this prepolymer was evaluated by an ebullioscopic method as being on the average of 790.

To increase the molecular weight of the prepolymer, modified methods of working at low temperatures and with low catalyst concentrations were used.

EXAMPLE 2

In a typical procedure, 0.582 g. of 3-nitropropene oxide dissolved in 2.5 ml. of methylene chloride (pre-dried over $CaH_2$) was placed in a glass bomb capable of withstanding a pressure of several hundred pounds. The system, including the reaction zone in the glass bomb, was cooled to liquid $N_2$ temperature and 20 mm. of $PF_5$ from a 15 ml. storage vessel was condensed into the system. The liquid nitrogen system was replaced by a trichloroethylene-Dry Ice bath and the bath was allowed to warm up to room temperature over a course of 2 hours. The system was recooled and an additional 40 mm. of $PF_5$ was condensed into the reaction mixture. This cooling and warming with the addition of $PF_5$ was repeated another three times until a total of 225 mm. of PF₅ had been added. The gas was then stripped off and submitted to mass spectrometer analysis. The analysis showed the gas to be 100% $CH_2Cl_2$, indicating that the $PF_5$ remained tied up with the polymer and that no degradation of the product to gaseous products occurred. The amber oil remaining was analyzed as follows:

Elemental analysis of 3-nitropropene oxide polymer ($PF_5$ catalyst)

Calculated analysis based on $C_3H_5NO_3$.—Calc'd (percent): C, 34.90; H, 4.85; N, 13.60; C/N, 3.00. Found (percent): C, 33.43; H, 4.82; N, 12.83; C/N, 3.04.

The difference between the calculated and found values of C/N are indicated to be due to the presence of catalyst residues and terminal hydroxyl groups.

The molecular weight of the polynitro-polyether prepolymer was 607.

The polynitro-polyether prepolymers formed from the nitroalkene oxides or nitro-oxetanes can be mixed with lower molecular weight liquid and solid oxidizers and with powdered metal-containing fuels in compounding a propellant. At the same time, a crosslinking agent can be admixed, for example, a diisocyanate and a catalyst. The resulting mixture can be ket flowable so that it can be poured into an open mold for shaping as the mixture is set to a solid grain. The mold cavity can be the combustion chamber in a rocket case.

In general, the binder components, including the prepolymer crosslinking agent and catalyst, are used in a proportion of 5 to 30 wt. percent of the total propellant grain. More preferably, the amount of binder is kept as low as necessary consistent with obtaining satisfactory bonding and strength, and for obtaining a propellant of desired specific impulse.

Tests have shown that the mixtures of the viscous oily polymers formed from the nitro epoxides or nitro cyclic ethers with an organic diisocyanate in the presence of a small amount of catalyst, e.g. ferric acetonyl acetonate, cures to a hard solid. The diisocyanate may be toluene diisocyanate, or diisocyanates containing energy groups, e.g. 2,3-bis-(difluoramino)-butane-1,4-diisocyanate.

Crosslinkable oily polymers that have been formed from the nitro alkene epoxides have molecular weights in the range of 500 to 1000 and thus contain, in the resulting addition polymer molecule, from 5 to 10 of the monomer units on the average. For coupling such polymer molecules with diisocyanate reactants, e.g. bis-($NF_2$)-butane diisocyanate, about 1 to 2 moles of the diisocyanate can be admixed with the oily polymers of 5 to 10 molecules of the epoxide monomer used in forming the crosslinkable polymers.

The following example illustrates the method of compounding ingredients in making a solid propellant of energy value using crosslinkable polymers of a nitro epoxide.

EXAMPLE 3

To form a solid rocket propellant having a specific impulse of 281, the following formulation is used:

| Ingredient: | Wt. percent |
|---|---|
| Tetrakis-($NF_2$)-tetrahydrofuran | 20 |
| Hexanitroethane | 55 |
| Boron powder | 5 |
| Binder ¹ | 20 |

¹ Binder containing 80 wt. percent of 3-nitropropene oxide polymer of about 800 mol wt. crosslinked with 20 wt. percent of 3,4-bis-($NF_2$)-butane diisocyanate.

The $NF_2$-containing oxidizer, tetrakis-($NF_2$)-tetrahydrofuran (liquid), the solid oxygen oxidizer, hexanitroethane, and the boron powder are mixed with the 3-nitropropene oxide polymer oil in the proportions tabulated with stirring at 25° C., or room temperature, for about 1 hour. Catalyst, e.g. $FeCl_3$ or $(CH_3)_2SnCl_2$, is added in a small amount, e.g. 0.2 wt. percent, and the set forth proportion of the diisocyanate is admixed. The mixture is stirred for over 4 hours at 25° C. until it sets to a solid grain. The propellant is found to be satisfactorily stable under ordinary conditions.

In the compounding of propellants with the nitroalkene oxides, variations can be made in selecting the $NF_2$ oxidizer, the oxygen oxidizer, and fuel.

The invention described is claimed as follows:

1. The crosslinked viscous oily polymer of 3-nitropropene oxide containing the recurring unit:

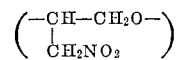

with terminal hydroxyl groups.

2. A crosslinkable polymer oil consisting essentially of an addition polymer of a nitroalkene oxide selected from the group consisting of 3-nitropropene oxide, 4,4-trinitrobutene oxide and 1,1,1,6,6,6-hexanitro-3-hexene oxide, said polymer having a polyether chain and side chains of attached nitroalkyl groups.

3. Process for preparing a crosslinkable polymer having a polyether chain with attached nitroalkyl groups, which comprises forming a mixture of about 0.5 to 6 wt. percent of $PF_5$ catalyst with a nitroalkene oxide selected from the group consisting of 3-nitropropene oxide, 4,4-trinitrobutene oxide and 1,1,1,6,6,6-hexanitro-3-hexene oxide, and stirring the mixture until an addition polymer oil of the nitroalkene oxide is formed.

4. Process for preparing a crosslinkable polymer of 3-nitropropene oxide, which comprises forming a mixture of the 3-nitropropene oxide with about 0.5 to 6 wt. percent of $PF_5$ catalyst, stirring the mixture until said 3-nitropropene oxide is polymerized to a polymer oil, and recovering the resulting polymer oil.

References Cited

Noble, Jr., et al., Chem. Reviews, vol. 64, pp. 50 to 57 (1964).

LELAND A. SEBASTIAN, Primary Examiner

U.S. Cl. X.R.

149—19; 260—75.5, 348, 615